(12) United States Patent
Suzuki (10) Patent No.: US 8,194,321 B2
(45) Date of Patent: Jun. 5, 2012

(54) PHOTOGRAPHING LENS AND CAMERA

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 527 days.

(21) Appl. No.: 12/441,385

(22) PCT Filed: Sep. 11, 2007

(86) PCT No.: PCT/JP2007/000991
§ 371 (c)(1),
(2), (4) Date: Mar. 14, 2009

(87) PCT Pub. No.: WO2008/032447
PCT Pub. Date: Mar. 20, 2008

(65) Prior Publication Data
US 2010/0007957 A1    Jan. 14, 2010

(30) Foreign Application Priority Data
Sep. 15, 2006    (JP) .................................. 2006-250683

(51) Int. Cl.
*G02B 5/18* (2006.01)
(52) U.S. Cl. ......................... 359/576; 359/570; 359/569
(58) Field of Classification Search .................. 359/566, 359/568, 576
See application file for complete search history.

(56) References Cited

U.S. PATENT DOCUMENTS

| | | | |
|---|---|---|---|
| 6,624,943 B2* | 9/2003 | Nakai et al. | 359/569 |
| 7,612,940 B2* | 11/2009 | Suzuki | 359/569 |
| 2001/0055157 A1* | 12/2001 | Shirasuna | 359/566 |
| 2003/0053212 A1* | 3/2003 | Ogawa | 359/570 |
| 2006/0087737 A1* | 4/2006 | Choi et al. | 359/566 |
| 2011/0090566 A1* | 4/2011 | Ukuda | 359/576 |

FOREIGN PATENT DOCUMENTS

| | | |
|---|---|---|
| EP | 1 600 803 A1 | 11/2005 |
| JP | 2004-126391 A | 4/2004 |
| JP | 2005-062224 A | 3/2005 |
| JP | 2005-284110 A | 10/2005 |
| JP | 2005-301048 A | 10/2005 |
| WO | WO 2004/079426 A1 | 9/2004 |

OTHER PUBLICATIONS

Suzuk,I Kenzaburo, Guide to Diffractive Optical Elements, The Optronics Co., Ltd., Feb. 8, 2006, pp. 163-175.

(Continued)

*Primary Examiner* — Arnel C Lavarias
(74) *Attorney, Agent, or Firm* — Miles & Stockbridge P.C.

(57) ABSTRACT

A small shooting lens has high optical performance and is suitable for mass production. To attain this, the shooting lens includes at least three lens groups disposed in order from an object side, wherein an adhesion multiple-layer diffractive optical element is formed on one of surfaces disposed between an object surface and an imaging plane, and a maximum image height Y and an entire length L satisfy $0.1 < Y/L < 3.0$ ... (1). Thus using the multiple-layer diffractive optical element in the shooting lens makes it possible to improve diffraction efficiency over a wide range and reduce flare. Particularly, the multiple-layer diffractive optical element has a merit that its production and assembling are easy. Further, according to the conditional expression (1), it is possible to realize the downsizing of the shooting lens while also maintaining its imaging quality.

11 Claims, 7 Drawing Sheets

OTHER PUBLICATIONS

Kuno Tetsuya, "Current Status and Future Prospects of Portable Telephones with Cameras," Optical and Electro-Optical Engineering Contact, vol. 42, No. 9, Japan Optomechatronics Association, 2004, pp. 444-449.

William C. Sweatt, "Mathematical equivalence between a holographic optical element and an ultra-high index lens," Journal of the Optical Society of America, vol. 69, No. 3, Mar. 1979, pp. 486-487.

* cited by examiner

PHOTOGRAPHING LENS AND CAMERA

CROSS-REFERENCE TO RELATED APPLICATION

This application is a 371 of International Application No. PCT/JP2007/000991 filed Sep. 11, 2007, which claims the priority of Japanese Patent Application No. 2006-250683 filed Sep. 15, 2006.

TECHNICAL FIELD

The present invention relates to a shooting lens suitable for a small camera mounted on mobiles such as mobile phones and notebook computers and relates to a camera.

BACKGROUND ART

Currently, in a small camera of a mobile phone and the like, a small shooting lens having lenses whose number is reduced to three to four is used. In recent years, in order to reduce the number of lenses on one hand and to improve imaging quality (especially to correct chromatic aberration) on the other, there has been proposed a technique of combining a diffractive optical element with a shooting lens (see Patent Document 1 and so on).

Patent Document 1: Japanese Unexamined Patent Application Publication No. 2005-301048

DISCLOSURE

Problems to be Solved

In the shooting lens described in the Patent Document 1, however, unnecessary diffraction lights generated in a diffraction grating become flare to cause haze in an image even though chromatic aberration is favorably corrected.

Therefore, it is a proposition of the present invention to provide a small shooting lens and camera having high optical performance and suitable for mass production.

Means for Solving the Problems

In a first aspect of the present invention, there is provided a shooting lens including at least three lens groups disposed in order from an object side, wherein an adhesion multiple-layer diffractive optical element is formed on one of surfaces disposed between an object surface and an imaging plane, and a maximum image height Y and an entire length L of the shooting lens satisfy a conditional expression (1) below.

$$0.1 < Y/L < 3.0 \quad (1)$$

In a second aspect of the present invention, there is provided a shooting lens including at least three lens groups disposed in order from an object side, wherein an adhesion multiple-layer diffractive optical element is formed on one of surfaces disposed between an object surface and an imaging plane, and a thickness d1 on an optical axis of one of two layers in mutual adhesion of the adhesion multiple-layer diffractive optical element, a thickness d2 on the optical axis of the other of the two layers, and a total thickness d (including d1 and d2) on the optical axis of the lens group as a formation location of the adhesion multiple-layer diffractive optical element satisfy a conditional expression (2) below.

$$0.02 < (d1+d2)/d < 1.0 \quad (2)$$

In a third aspect of the present invention, there is provided a shooting lens including at least three lens groups disposed in order from an object side, wherein an adhesion multiple-layer diffractive optical element is formed on one of surfaces disposed between an object surface and an imaging plane, and a distance Z on an optical axis from a diffractive optical surface of the adhesion multiple-layer diffractive optical element to an aperture stop and a paraxial curvature radius R of a base surface on which the adhesion multiple-layer diffractive optical element is formed satisfy a conditional expression (3) below.

$$-2.0 < Z/R < -0.3 \quad (3)$$

In a fourth aspect of the present invention, there is provided a shooting lens including at least three lens groups disposed in order from an object side, wherein an adhesion multiple-layer diffractive optical element is formed on one of surfaces disposed between an object surface and an imaging plane, and a thickness d1 on an optical axis of one of two layers in mutual adhesion of the adhesion multiple-layer diffractive optical element, a thickness d2 on the optical axis of the other of the two layers, and a minimum grating pitch p of a diffractive optical surface of the adhesion multiple-layer diffractive optical element satisfy a conditional expression (4) below.

$$0.001 < p/(d1+d2) < 1.0 \quad (4)$$

Preferably, one of the two layers in mutual adhesion of the adhesion multiple-layer diffractive optical element is made of a high refractive index and small dispersion material, and the other is made of a low refractive index and large dispersion material, and an Abbe number difference $\Delta\upsilon d$ between the two layers and a refractive index difference $\Delta Nd$ between the two layers satisfy a conditional expression (5) below.

$$50 < \Delta\upsilon d/\Delta Nd < 2000 \quad (5)$$

Preferably, a diffraction efficiency Ed for a d-line, a diffraction efficiency Eg for a g-line, and a diffraction efficiency EC for a C-line of the adhesion multiple-layer diffractive optical element satisfy a conditional expression (6) below.

$$(Eg+EC)/2 > 0.9 \times Ed \quad (6)$$

Preferably, an incident angle $\theta$ at which a principal ray of a light flux directed to a maximum image height passing through the shooting lens is incident on the adhesion multiple-layer diffractive optical element satisfies a conditional expression (7) below.

$$\theta < 10° \quad (7)$$

Preferably, an effective diameter C of the adhesion multiple-layer diffractive optical element and a focal length f of a whole system of the shooting lens satisfy a conditional expression (8) below.

$$0.1 < C/f < 3.0 \quad (8)$$

Further, each of the three lens groups may have a positive refractive power.

Preferably, a radius of curvature R of the base surface on which the adhesion multiple-layer diffractive optical element is formed and the entire length L of the shooting lens satisfy a conditional expression (9) below.

$$0.05 < |R/L| \quad (9)$$

In a fifth aspect of the present invention, there is provided a camera including the shooting lens of any one of the first aspect to the fourth aspect, and an imaging device disposed near the imaging plane of the shooting lens.

Effect

According to the present invention, a small shooting lens and camera suitable for mass production and having high optical performance are realized.

DETAILED DESCRIPTION OF THE EMBODIMENTS

First, a diffractive optical element will be briefly described.

The diffractive optical element utilizes a diffraction phenomenon of light, while a lens utilizes a refraction phenomenon of light and a mirror utilizes a reflection phenomenon of light. In the diffractive optical element, a surface where the diffraction phenomenon occurs (hereinafter, referred to as a "diffractive optical surface"), if having a positive refractive power, has a negative dispersion value, which enables favorable chromatic aberration correction that could be achieved only by special glass.

In particular, a multiple-layer diffractive optical element made up of a plurality of stacked diffractive optical surfaces has high diffraction efficiency over a wide range, which is advantageous for reducing flare. Among all, an adhesion multiple-layer diffractive optical element made up of two diffractive optical surfaces in mutual adhesion has a merit that its production and assembling are easy. Particulars about the adhesion multiple-layer diffractive optical element are described in detail in "Guide to Diffractive Optical Element, Enlarged and Revised Edition (published on Feb. 8, 2006) published by Optronics Co., Ltd., "Optical and Electrooptical Engineering Contact, September, 2004", and the like. In this specification, an adhesion multiple-layer Fresnel diffractive optical element will be simply called an "adhesion multiple-layer diffractive optical element".

Next, an embodiment of a shooting lens and a camera including the same will be described.

Figure 1:
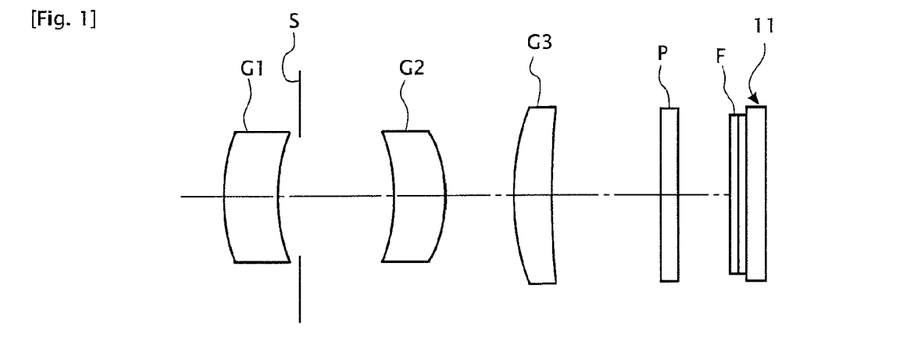
FIG. 1 is a schematic view of a shooting lens and a camera including the same of an embodiment.

FIG. 1 is a schematic view of a shooting lens and a camera including the same of this embodiment.

As shown in FIG. 1, the shooting lens of this embodiment has at least three lens groups G1, G2, G3 in order from an object side. Reference numeral 11 denotes an imaging device disposed near an image plane of the shooting lens, and reference symbol S denotes an aperture stop. On at least one of surfaces of the shooting lens, an adhesion multiple-layer diffractive optical element is formed. The formation location thereof is a surface of one of the lens groups G1, G2, G3, a surface of a parallel plate P disposed separately from the lens groups G1, G2, G3, a surface of a filter F provided on a front surface of the imaging device 11, or the like. For information, the filter F is a dust filter, a low-pass filter, or the like of the imaging device 11.

Thus forming the multiple-layer diffractive grating on one of the surfaces of the shooting lens makes it possible to reduce both chromatic aberration and flare of the shooting lens.

Here, a maximum image height Y and an entire length L of the shooting lens satisfy the following conditional expression (1).

$$0.1 < Y/L < 3.0 \quad (1)$$

This conditional expression (1) defines an appropriate range of the entire length L of the shooting lens by its ratio to the maximum image height Y. When Y/L is smaller than the lower limit value of the conditional expression (1), the shooting lens cannot be made small and a lens diameter becomes excessively large. Further, oblique aberration of the shooting lens becomes large as well and thus favorable imaging quality is difficult to obtain. When Y/L is larger than the upper limit value of the conditional expression (1), an exit pupil of the shooting lens becomes close to the image plane, which makes it difficult to make an imaging luminous flux directed toward the image plane nearly telecentric. Further, distortion aberration (especially distortion aberration of + side) of the shooting lens is likely to occur. By setting the upper limit value to 0.7 and the lower limit value to 0.15 in the conditional expression (1), it is possible to more sufficiently obtain the effects of the downsizing and improvement in imaging quality.

Further, in the shooting lens, assigning the function of chromatic aberration correction to the adhesion multiple-layer diffractive optical element allows all the three lens groups G1, G2, G3 to have refractive powers with a plus sign. When the signs of the refractive powers of the three lens groups G1, G2, G3 are the same, the lens groups G1, G2, G3 can have gentle curves, resulting in lower error sensitivity to eccentricity of the individual lens groups G1, G2, G3, which facilitates assembling the shooting lens.

FIG. 2, FIG. 3, FIG. 4, and FIG. 5 are schematic views showing structure examples of the adhesion multiple-layer diffractive optical element.

In FIG. 2, FIG. 3, FIG. 4, and FIG. 5, reference symbol DOE denotes the adhesion multiple-layer diffractive optical element, and reference symbol B denotes an optical member as a formation location of the adhesion multiple-layer diffractive optical element DOE. The optical member B corresponds to one of the lens groups G1, G2, G3, the filter F, and the parallel plate P in FIG. 1. In these drawings, a formation surface (base surface) for the adhesion multiple-layer diffractive optical element DOE is depicted as a planar surface and the shape of diffractive optical surfaces DOS is depicted rougher than the actual shape.

Figure 2:
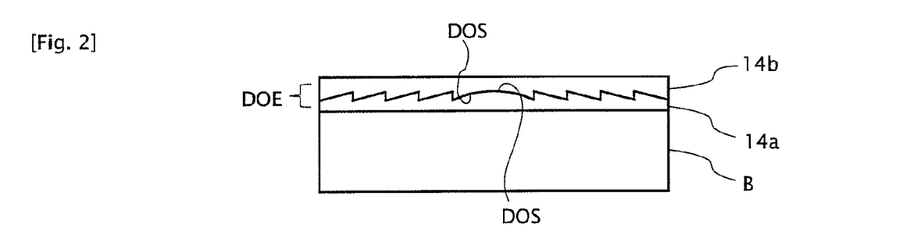
FIG. 2 is a schematic view showing a structure example of an adhesion multiple-layer diffractive optical element.

In the example shown in FIG. 2, two layers 14a, 14b are stacked on a surface of the optical member B and boundary surfaces of the layers 14a, 14b are the diffractive optical surfaces DOS. These diffractive optical surfaces DOS in mutual adhesion form the adhesion multiple-layer diffractive optical element DOE.

Figure 3:
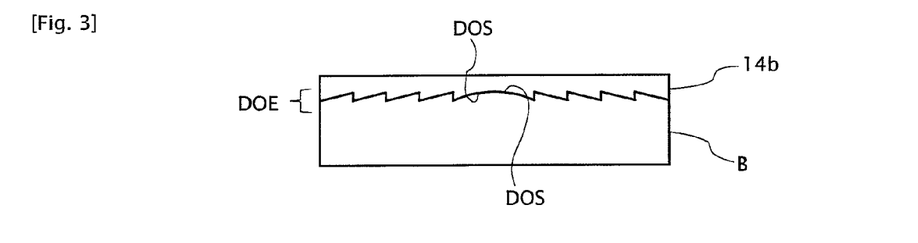
FIG. 3 is a schematic view showing a structure example of the adhesion multiple-layer diffractive optical element.

In the example shown in FIG. 3, a relief pattern is engraved on a surface of the optical member B and one layer 14b is formed thereon in adhesion. Each boundary surfaces of the optical member B and the layer 14b are the diffractive optical surfaces DOS. The diffractive optical surfaces DOS in mutual adhesion form the adhesion multiple-layer diffractive optical element DOE.

Figure 4:
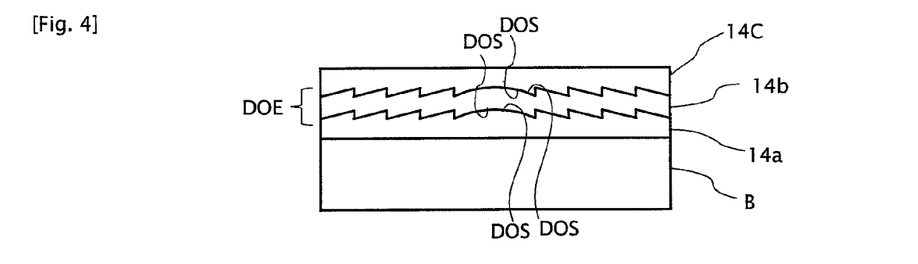
FIG. 4 is a schematic view showing a structure example of the adhesion multiple-layer diffractive optical element.

In the example in FIG. 4, three layers 14a, 14b, 14c are stacked on a surface of the optical member B and each boundary surfaces of the layers 14a, 14b, 14c are the diffractive optical surfaces DOS. The diffractive optical surfaces DOS in mutual adhesion form the adhesive multiple-layer diffractive optical element DOE.

Figure 5:
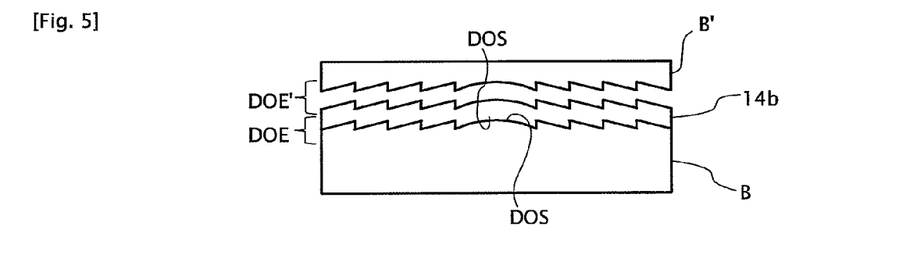
FIG. 5 is a schematic view showing a structure example of the adhesion multiple-layer diffractive optical element.

In the example shown in FIG. 5, a relief pattern is engraved on a surface of the optical member B and one layer 14b is formed thereon in adhesion. Each boundary surfaces of the optical member B and the layer 14b are the diffractive optical surfaces DOS. The diffractive optical surfaces DOS in mutual adhesion form the adhesion multiple-layer optical element DOE. Further, in the example in FIG. 5, a relief pattern is formed on a surface of the layer 14b as well, and an optical member B' is disposed thereabove with a minute gap. A relief pattern is formed on the gap side of the optical member B' as well and the relief pattern on the surface of the layer 14b, the gap, and the relief pattern of the optical member B' form a discrete multiple-layer diffractive optical element DOE'. That is, in the example shown in FIG. 5, the adhesion multiple-layer diffractive optical element DOE and the discrete multiple-layer diffractive optical element DOE' are combined.

In each of the adhesion multiple-layer diffractive optical elements DOE described above, a thickness d1 on an optical axis of one layer out of the two layers in mutual adhesion (the layers 14a, 14b in the example in FIG. 2), a thickness d2 on the optical axis of the other layer, a total thickness d (including d1 and d2) on the optical axis of the optical member B satisfy the following conditional expression (2).

$$0.02 < (d1+d2)/d < 1.0 \tag{2}$$

This conditional expression defines a proper thickness on the optical axis of the adhesion multiple-layer diffractive optical element DOE. When (d1+d2)/d is larger than the upper limit value of this conditional expression, the thickness of the adhesion multiple-layer diffractive optical element DOE becomes excessively large, which is likely to result in difficulty in forming the diffractive optical surfaces DOS and requires a longer formation time, leading to a cost increase. Further, light absorption by the material (plastic) of the adhesion multiple-layer diffractive optical element DOE becomes large and transmittance of short wavelengths especially lowers.

On the other hand, when (d1+d2)/d is smaller than the lower limit value of this conditional expression, the thickness on the optical axis of the adhesion multiple-layer diffractive optical element DOE becomes excessively small, which similarly results in difficulty in forming the diffractive optical surfaces DOS (for example, roughness of the surfaces is likely to increase). Further, rays diffracted in the grating are incident on the next optical member before interfering with each other, which may possibly lead to not only a failure in obtaining predetermined diffraction rays but also a failure in obtaining diffraction rays with a large diffraction angle. To obtain a sufficient effect, it is desirable to set the upper limit value to 0.8 and the lower limit value to 0.05 in the conditional expression (2).

Further, a distance Z on the optical axis from the diffractive optical surface DOS of the adhesion multiple-layer diffractive optical element DOE to the aperture stop S and a radius of curvature (a paraxial curvature radius in a case of an aspheric surface) R of the base surface as the formation location of the adhesion multiple-layer diffractive optical element DOE satisfy the following conditional expression (3).

$$-2.0 < Z/R < -0.3 \tag{3}$$

This conditional expression defines a proper ratio between the position of the diffractive optical surface DOS (its distance on the optical axis from the aperture stop S) and the radius of curvature (the paraxial curvature radius in the case of the aspheric surface) R of the base surface. If this conditional expression is satisfied, a generation amount of flare decreases. Especially when Z/R=−1, the center of curvature of the base surface matches a pupil position, and when the base surface is a spherical surface, a principal ray is vertically incident, so that a generation amount of flare becomes the smallest.

Incidentally, when Z/R is larger than the upper limit value of this conditional expression, R becomes excessively large and thus an incident angle on the diffractive optical surface DOS becomes too large, resulting in an increase in a generation amount of flare. Further, coma aberration of higher rays than the principal ray increases, which results in deterioration in imaging quality.

On the other hand, when Z/R is smaller than the lower limit value of this conditional expression, R becomes excessively small, which not only makes it difficult to machine the base surface but also increases the incident angle on the diffractive optical surface DOS, resulting in an increase in a generation amount of flare. To obtain a sufficient effect, it is desirable to set the upper limit value to −0.5 and the lower limit value to −1.5 in the conditional expression (3).

However, if the conditional expression (3) is tried to be satisfied when the base surface is a planer surface, R becomes infinite to diverge, and therefore, conditional expressions (7) to (7") are preferably used for the definition instead of using the conditional expression (3) for the definition (that is, an angle at which the principal ray with the maximum image height is incident on the grating is used for the definition).

Further, the thickness d1 on the optical axis of one of the two layers in mutual adhesion (for example, the object-side layer) of the adhesion multiple-layer diffractive optical element DOE, the thickness d2 on the optical axis of the other (for example, the image-side layer), and a minimum grating pitch p of the diffractive optical surface DOS satisfy the following conditional expression (4).

$$0.001 < p/(d1+d2) < 1.0 \tag{4}$$

This conditional expression defines a proper relation between the minimum grating pitch of the diffractive optical surface DOS and the thickness of the adhesion multiple-layer diffractive optical element DOE. When p/(d1+d2) is larger than the upper limit value of this conditional expression, the minimum grating pitch of the diffractive optical surface DOS becomes excessively large, resulting in difficulty in precision machining. Further, a diffraction angle becomes small, which is liable to result in insufficient chromatic aberration correction. In particular, this is liable to result in insufficient correction of chromatic aberration of magnification.

On the other hand, when p/(d1+d2) is smaller than the lower limit value of this conditional expression, the minimum grating pitch of the diffractive optical surface DOS becomes excessively small and an aspect ratio of the diffractive optical surface DOS becomes large, which not only makes it difficult to fabricate the grating itself but also increases a generation amount of flare to easily impair image quality. To obtain a sufficient effect, it is desirable to set the upper limit value to 0.5 and the lower limit value to 0.002 in this conditional expression.

Further, in each of the adhesion multiple-layer diffractive optical elements DOE described above, a high refractive index and small dispersion material is used for one of the two layers in mutual adhesion (the layers 14a, 14b in the example in FIG. 2), and a low refractive index and large dispersion material is used for the other. Further, an Abbe number difference Δυd and a refractive index difference ΔNd between the two layers satisfy the following conditional expression (5).

$$50 < \Delta \upsilon d / \Delta Nd < 2000 \quad (5)$$

When Δυd/ΔNd is larger than the upper limit value of the conditional expression (5), it is difficult to obtain high diffraction efficiency over a wide wavelength band. On the other hand, when Δυd/ΔNd is smaller than the lower limit value of the conditional expression (5), it is similarly difficult to obtain high diffraction efficiency over a wide wavelength band. Strictly setting the condition such that the upper limit value is set to 1000 and the lower limit value is set to 200 in the conditional expression (5) makes it possible to sufficiently obtain high diffraction efficiency over a wide wavelength band.

Further, as a material of the optical member B as the formation location of the adhesion multiple-layer diffractive optical element DOE, optical glass is used, for instance, and for its machining, precision grinding or glass mold forming is employed. As materials of the layers 14a, 14b, 14c forming the adhesion multiple-layer diffractive optical element DOE, optical plastic is used for instance, and for their machining, plastic mold forming is applied. Further, if importance is put on productivity, light curing plastic (UV curing plastic) is suitable as the kind of the optical plastic. The use of the light curing plastic can reduce the number of processes, realizing cost reduction.

Further, if importance is put on productivity, characteristics of the light curing plastics used for the two layers in mutual adhesion (the layers 14a, 14b in the example in FIG. 2) are desirably in the following relation. That is, viscosity of the light curing plastic in an uncured state used for one of the two layers is 40 cP or higher and viscosity of the light curing plastic in an uncured state used for the other is 2000 cP or higher.

Further, if importance is put on productivity, it is desirable that a grating pitch p and a grating height h of the diffractive optical surface DOS satisfy p/h>0.15. Further, a thickness (thickness on the optical axis) of each of the layers (the layers 14a, 14b in the example in FIG. 2) forming the adhesion multiple-layer diffractive optical element DOE is preferably reduced to 50 μm or less.

Further, to prevent flare, the grating height h of the diffractive optical surface DOS is preferably 30 μm or less. This is because, if the grating height h is 30 μm or less, it is possible to obtain sufficiently high diffraction efficiency of light incident on the diffractive optical surface DOS at an incident angle other than 0° and to reduce a loss of light quantity and scattering in a stepped portion of the diffractive optical surface DOS.

Further, diffraction efficiency Ed for a d-line, diffraction efficiency Eg for a g-line, and diffraction efficiency EC for a C-line of the adhesion multiple-layer diffractive optical element DOE satisfy the following conditional expression (6).

$$(Eg+EC)/2 > 0.9 \times Ed \quad (6)$$

If the conditional expression (6) is not satisfied, flare may possibly become large. Incidentally, the use of a conditional expression (3') instead of the conditional expression (6) can surely reduce the flare.

$$(Eg+EC)/2 > 0.97 \times Ed \quad (3')$$

Further, the angle θ at which the principal ray of the luminous flux with the maximum image height passing through the shooting lens is incident on the adhesion multiple-layer diffractive optical element DOE satisfies the following conditional expression (7).

$$\theta < 10° \quad (7)$$

If the conditional expression (7) is satisfied, the angle at which rays are incident on the adhesion multiple-layer diffractive optical element DOE is reduced as a whole, enabling a reduction in flare. However, in actual practice, the following conditional expression (7') is desirably satisfied, and to obtain a sufficient effect, the conditional expression (7") is desirably satisfied.

$$\theta < 7° \quad (7')$$

$$\theta < 5° \quad (7'')$$

In order to satisfy these conditional expressions (7)~(7"), as the formation location of the adhesion multiple-layer diffractive optical element DOE, the second lens group G2 or the third lens group G3 is more suitable than the first lens group G1 shown in FIG. 1. For example, if the formation location of the adhesion multiple-layer diffractive optical element DOE is a surface having nearly a concentric relation with the pupil (aperture stop S) (a surface having the center of curvature near the pupil), that is, the surface of the second lens group G2 or the like, the incident angle of the rays becomes small, and thus the conditional expressions (7)~(7") are easily satisfied. Among all, if the object-side surface of the second lens group G2 is selected, the luminous flux incident on the image plane can be easily made nearly telecentric, which is preferable. Incidentally, the formation surface for the adhesion multiple-layer diffractive optical element DOE may be a concave surface or may be a convex surface.

Further, if importance is put on chromatic aberration correction, the second lens group G2 is desirably a concave or convex meniscus lens. Especially when the second lens group G2 is the concave meniscus lens, it is possible to realize chromatic aberration correction of all the lens groups G1, G2, G3 by using convex lenses as the lens groups G1, G3, which can lighten a burden of the chromatic aberration correction to the adhesion multiple-layer diffractive optical element DOE.

Further, an effective diameter C of the adhesion multiple-layer diffractive optical element DOE and a focal length f of the whole system of the shooting lens satisfy the following conditional expression (8).

$$0.1 < C/f < 3.0 \quad (8)$$

The conditional expression (8) defines an appropriate range of the effective diameter C by its ratio to the focal length f. When C/f is larger than the upper limit value of the conditional expression (8), the effective diameter is too large, which makes it difficult to fabricate the adhesion multiple-layer diffractive optical element DOE. Further, when the effective diameter is large, stray light from exterior easily enters the diffractive optical surface DOS, which is liable to lower image quality. On the other hand, when C/f is smaller than the lower limit value of the conditional expression (8), the effective diameter is too small and thus the grating pitch of the diffractive optical surface DOS becomes extremely small, which makes it difficult to fabricate the adhesion multiple-layer diffractive optical element DOE. Further, when the grating pitch is too small, flare easily occurs. By setting the upper limit value to 2.0 and the lower limit value to 0.2 in the conditional expression (8), it is possible to more sufficiently obtain the effect regarding the fabrication of the adhesion multiple-layer diffractive optical element DOE and the effect regarding image quality.

Further, the radius of curvature R of the base surface on which the adhesion multiple-layer diffractive optical element DOE is formed and the entire length L of the shooting lens satisfy the following conditional expression (9).

$$0.05 < |R/L| \quad (9)$$

The conditional expression (9) defines an appropriate range of the radius of curvature R of the base surface by its ratio to the entire length L. If the conditional expression (9) is not satisfied, a curve of the base surface becomes steep, which makes it difficult to fabricate the adhesion multiple-layer diffractive optical element DOE. Further, if the curve of the base surface is steep, there arises a problem that distortion aberration of + side is liable to occur. By setting the lower limit value of the conditional expression (9) to 0.15, it is possible to more sufficiently obtain the effect regarding the fabrication of the adhesion multiple-layer diffractive optical element DOE and the effect regarding image quality.

Further, it is desirable that a maximum spread width A of axial chromatic aberration of the d-line, g-line, C-line, and F-line and the focal length f of the shooting lens satisfy the following conditional expression (10).

$$\Delta/f < 0.1 \quad (10)$$

The conditional expression (10) defines an appropriate correction range of the axial chromatic aberration. When Δ/f is larger than the upper limit value of the conditional expression (10), chromatic aberration becomes large to cause coloring of an image. Since the axial aberration cannot be reduced to completely zero, the conditional expression (10) is actually expressed as the conditional expression (10').

$$0.001 < \Delta/f < 0.1 \quad (10')$$

It is possible to surely prevent the coloring of an image by setting the upper limit value to 0.03 and the lower limit value to 0.002 in the conditional expression (10'). The reason why the shooting lens can satisfy the conditional expressions (10), (10') is because the adhesion multiple-layer diffractive optical element DOE is used.

Further, the minimum grating pitch p of the diffractive optical surface DOS and the focal length f of the shooting lens desirably satisfy the following conditional expression (11).

$$0.001 < p/f < 0.1 \quad (11)$$

The conditional expression (11) defines an appropriate range of the minimum grating pitch by its ratio to the focal length f. When p/f is smaller than the lower limit value of the conditional expression (11), the grating pitch is too small, which makes it difficult to fabricate the adhesion multiple-layer diffractive optical element DOE. Further, flare may possibly occur. When p/f is larger than the upper limit value of the conditional expression (11), the grating pitch is too large, which similarly makes it difficult to fabricate the adhesion multiple-layer diffractive optical element DOE. In addition, chromatic aberration correction may possibly become insufficient. By setting the upper limit value to 0.02 and the lower limit value to 0.003 in the conditional expression (11), it is possible to more sufficiently obtain the effect regarding the fabrication and the effect regarding image quality.

As described above, the shooting lens of this embodiment satisfying the various conditional expressions is made small and can be put in an extremely small mounting space. Further, the shooting lens of this embodiment has excellent imaging quality, and what is more, is suitable for mass production. Therefore, the shooting lens of this embodiment is suitable for a small camera of mobiles, for example, mobile phones, notebook computers, and the like. Further, the shooting lens of this embodiment is effective for downsizing other digital cameras and video cameras.

For more improved imaging quality of the shooting lens of this embodiment, a gradient index lens may be used as one of the lens groups G1, G2, G3.

Further, the following focusing technique may be applied to the shooting lens of this embodiment. In the shooting lens of this embodiment, as focusing for a near-distance object, either of what is called an all-group focusing system of moving out the entire shooting lens toward a subject side and what is called a front focusing system of moving out only the first lens group G1 in FIG. 1 toward the object side is applicable. However, in order to secure a peripheral light quantity without lowering the principal ray at the time of focusing, what is called a rear focusing system of moving the third lens group G3 in the optical axis direction is desirable.

Further, the following vibration absorbing function may be applied to the shooting lens of this embodiment. Generally, most of small cameras are not equipped with a strobe with a large light emission amount, but being used in hand-held shooting in a dark place in many occasions, the small camera is liable to have camera shake, which is a cause of image quality deterioration, and therefore, it is convenient if the vibration absorbing function is equipped in the shooting lens of this embodiment. In this case, the shooting lens is provided with a mechanism shifting part of the lens groups (or lenses) of the shooting lens in the optical axis direction, a sensor detecting a deviation amount of an image formed on the imaging device, and a controller driving the mechanism so as to reduce the deviation amount.

Incidentally, the same vibration absorbing function may be obtained by moving the imaging device of the camera instead of moving part of the shooting lens. That is, it is possible to equip the camera and the shooting lens of this embodiment with any of various kinds of publicly-known vibration absorbing functions.

Example 1

A first example of the shooting lens will be described.

Figure 6:
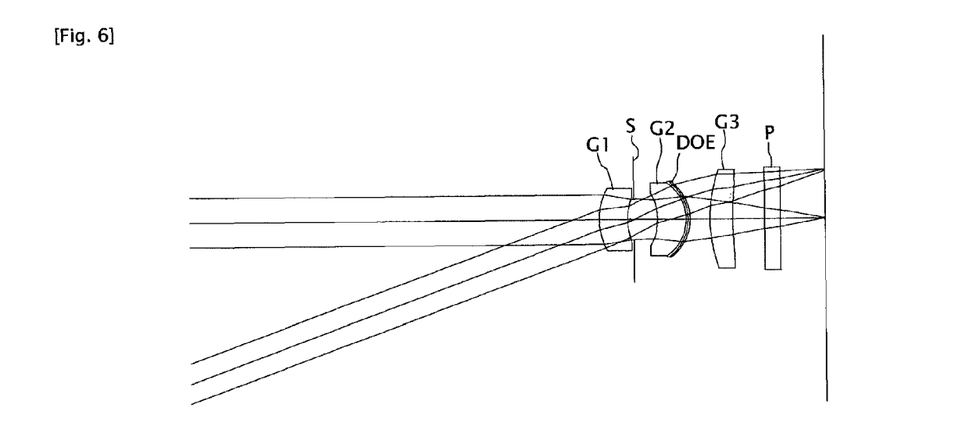
FIG. 6 is a ray diagram of a shooting lens of a first example.

FIG. 6 is a ray diagram of a shooting lens of this example. As shown in FIG. 6, the shooting lens of this example has, in order from an object side, a first lens G1 having a positive refractive power, a second lens G2 having a positive refractive power, a third lens G3 having a positive refractive power, and a parallel plate P, and the adhesion multiple-layer diffractive optical element DOE of the type shown in FIG. 2 is formed on an image-side surface of the second lens G2.

Table 1 shows lens data of the shooting lens of this example. In Table 1, m is surface number, r is radius of curvature, d is surface separation, n(d) is refractive index for a d-line, n(g) is refractive index for a g-line, n(C) is refractive index for a C-line, and n(F) is refractive index for an F-line.

In Table 1, * is appended to the surface numbers of aspheric surfaces or diffractive optical surfaces, and the shape of the diffractive optical surface is converted to the equivalent of the aspheric surface by an ultrahigh refractive index method. The ultrahigh refractive index method is described in detail in "Guide to Diffractive Optical Element, Enlarged and Revised Edition (published on Feb. 8, 2006) published by Optronics Co., Ltd. and so on. In the conversion, 1001 is substituted in the refractive index of the d-line on the diffractive optical surface and 7418.6853 is substituted in the refractive index of the g-line on the diffractive optical surface. Further, a wavelength $\lambda_d$ of the d-line, a wavelength $\lambda_g$ of the g-line, a wavelength $\lambda_C$ of the C-line, and a wavelength $\lambda_F$ of the F-line are selected as follows.

$\lambda_d$=587.562 nm
$\lambda_g$=435.835 nm
$\lambda_C$=656.273 nm
$\lambda_F$=486.133 nm

TABLE 1

| m | r | d | n(d) | n(g) | n(C) | n(F) |
|---|---|---|------|------|------|------|
| 0 (OBJ) | | INFINITY | 1.000000 | 1.000000 | 1.000000 | 1.000000 |
| 1* | 1.73000 | 0.70000 | 1.772789 | 1.792324 | 1.768074 | 1.783701 |
| 2* | 1.71377 | 0.15645 | 1.000000 | 1.000000 | 1.000000 | 1.000000 |
| 3 (STOP) | 0.00000 | 0.58450 | 1.000000 | 1.000000 | 1.000000 | 1.000000 |
| 4* | −1.41638 | 0.70000 | 1.524700 | 1.536490 | 1.521960 | 1.531290 |
| 5 | −1.10641 | 0.05000 | 1.527600 | 1.547700 | 1.523300 | 1.538500 |
| 6* (DOS) | −1.10641 | 0.00000 | 10001.000000 | 7418.68530 | 11170.425500 | 8274.731100 |
| 7* (DOS) | −1.10641 | 0.05000 | 1.556900 | 1.571100 | 1.553700 | 1.564800 |
| 8* | −1.10641 | 0.49279 | 1.000000 | 1.000000 | 1.000000 | 1.000000 |
| 9* | 3.72629 | 0.56270 | 1.524700 | 1.536490 | 1.521960 | 1.531290 |
| 10* | 7.97051 | 0.78239 | 1.000000 | 1.000000 | 1.000000 | 1.000000 |
| 11 | INFINITY | 0.39120 | 1.516330 | 1.526210 | 1.513860 | 1.521910 |
| 12 | INFINITY | 1.10876 | 1.000000 | 1.000000 | 1.000000 | 1.000000 |

As for a medium (=one of the layers forming the adhesion multiple-layer diffractive optical element DOE) between the fifth surface and the sixth surface, its viscosity in an uncured state is 100 cP and its refractive index for the d-line is 1.528. As for a medium (=the other of the layers forming the adhesion multiple-layer diffractive optical element DOE) between the seventh surface and the eighth surface, its viscosity in an uncured state is 4800 cP and its refractive index for the d-line is 1.557.

Table 2 shows data of the aspheric surfaces (including the diffractive optical surfaces). The shape of each of the aspheric surfaces (including the diffractive optical surfaces) is expressed by coefficients (aspheric surface coefficients) of terms when the aspheric surface is expressed by a polynomial (12).

$$S(y)=(y^2/r)/\{1+(1-Ky^2/r^2)^{1/2}\}+C_2y^2+C_4y^4+C_6y^6+C_8y^8+C_{10}y^{10} \quad (12)$$

Note that y is height in a direction vertical to the optical axis, S(y) is a sag value at the height y (distance in the optical axis direction from a tangent plane at a vertex of the aspheric surface), r is a radius of curvature at the vertex of the aspheric surface, K is a constant of the cone, and $C_n$ is the next aspheric surface coefficient.

Corresponding values of condition of this example are as follows:
Y=1.2,
L=5.579,
Δυd=15.46,
ΔNd=0.0293,
Eg=98.221,
EC=98.233,
Ed=99.999,
C=1.69,
f=3.367,
R=−1.1064,
Δ=0.0147,
p=0.0248,
d1=0.05,
d2=0.05,
d=0.8,
Z=1.3345,
Y/L of the conditional expression (1)=0.2151,
(d1+d2)/d of the conditional expression (2)=0.125,
Z/R of the conditional expression (3)=−1.20615,
p/(d1+d2) of the conditional expression (4)=0.248,
Δυd/ΔNd of the conditional expression (5)=527.645,
(Eg+EC)/2 of the conditional expression (6)=98.227,
0.9×Ed of the conditional expression (6)=89.999,

TABLE 2

| m | K | $C_2$ | $C_4$ | $C_6$ | $C_8$ | $C_{10}$ |
|---|---|-------|-------|-------|-------|----------|
| 1 | 2.1152 | 0.00000 | −2.51640 * $10^{-3}$ | −1.88330 * $10^{-2}$ | 8.27330 * $10^{-3}$ | −6.76100 * $10^{-3}$ |
| 2 | 0.6264 | 0.00000 | 9.67790 * $10^{-2}$ | −4.49130 * $10^{-2}$ | 2.26650 * $10^{-1}$ | 8.50470 * $10^{-3}$ |
| 4 | 0.3928 | 0.00000 | −1.31060 * $10^{-1}$ | 6.68580 * $10^{-2}$ | −1.72080 * $10^{-1}$ | 1.15650 * $10^{-1}$ |
| 6 | 0.8720 | 0.00000 | 5.36100 * $10^{-3}$ | 5.92020 * $10^{-2}$ | −4.84490 * $10^{-2}$ | 1.55530 * $10^{-2}$ |
| 7 | 0.8720 | −1.40000 * $10^{-6}$ | 5.36100 * $10^{-3}$ | 5.92020 * $10^{-2}$ | −4.84500 * $10^{-2}$ | 1.55530 * $10^{-2}$ |
| 8 | 0.8720 | 0.00000 | 5.36100 * $10^{-3}$ | 5.92020 * $10^{-2}$ | −4.84500 * $10^{-2}$ | 1.55530 * $10^{-2}$ |
| 9 | −25.4654 | 0.00000 | 7.28480 * $10^{-2}$ | −3.68140 * $10^{-2}$ | 9.70870 * $10^{-3}$ | −8.39250 * $10^{-4}$ |
| 10 | −170.8533 | 0.00000 | 1.60870 * $10^{-2}$ | −2.44320 * $10^{-2}$ | 7.49490 * $10^{-3}$ | −6.53640 * $10^{-4}$ |

Figure 7:
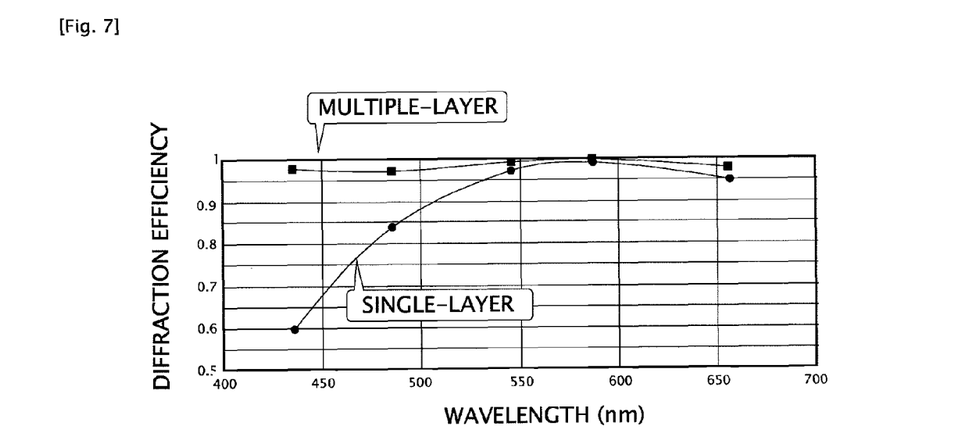
FIG. 7 is a chart showing wavelength dependency of diffraction efficiency of the adhesion multiple-layer diffractive optical element of the example.

FIG. 7 is a chart showing wavelength dependency of diffraction efficiency of the adhesion multiple-layer diffractive optical element DOE of this example. FIG. 7 shows a ratio of the diffraction efficiency of each wavelength based on diffraction efficiency of the g-line. Further, for comparison, FIG. 7 shows wavelength dependency of diffraction efficiency of a single-layer diffractive optical element as well. As shown in FIG. 7, in the adhesion multiple-layer diffractive optical element DOE of this example, diffractive efficiency of 0.97 or more is obtained over a wide wavelength band from the g-line to the C-line. This effect is similarly obtained in a second example and a third example which will be described later.

θ of the conditional expression (7)=1.004°,
C/f of the conditional expression (8)=0.502,
|R/L| of the conditional expression (9)=0.1983,
Δ/f of the conditional expression (10)=0.0044, and
p/f of the conditional expression (11)=0.0074.

That is, the shooting lens of this example satisfies all the conditional expressions (1) to (11).

Figure 8:
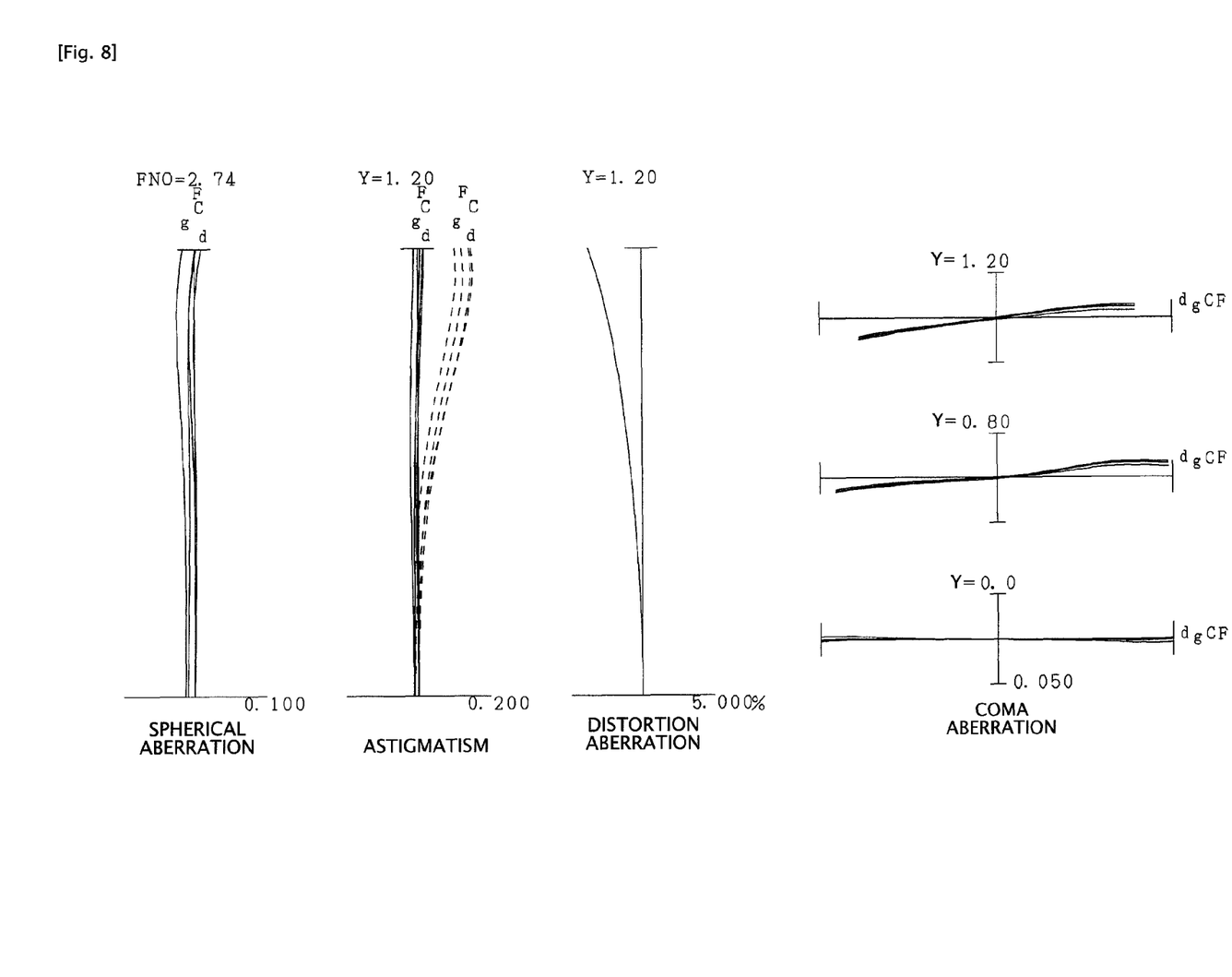
FIG. 8 is a various aberrations diagram of the first example.

FIG. 8 is a various aberrations diagram of this example. In FIG. 8, FNO represents F number and Y represents image height. In FIG. 8, d is a curve for the d-line, g is a curve for the g-line, C is a curve for the C-line, and F is a curve for the F-line. As shown in FIG. 8, in this example, excellent imaging quality is obtained with various aberrations being favorably corrected.

Example 2

A second example of the shooting lens will be described.

Figure 9:
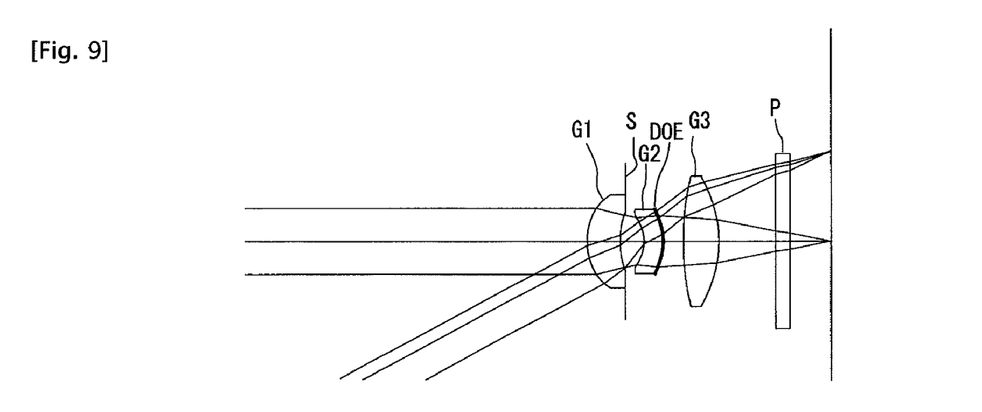
FIG. 9 is a ray diagram of a shooting lens of a second example.

FIG. 9 is a ray diagram of a shooting lens of this example. As shown in FIG. 9, the shooting lens has, in order from an object side, a first lens G1 having a positive refractive power, a second lens G2 having a negative refractive power, a third lens G3 having a positive refractive power, and a parallel plate P, and the adhesion multiple-layer diffractive optical element DOE of the type shown in FIG. 2 is formed on an image-side surface of the second lens G2.

Table 3 shows lens data of the shooting lens of this example A notation system of Table 3 is the same as that of Table 1. Further, a conversion method by an ultrahigh refractive index method is the same as that of the first example.

TABLE 3

| m | r | d | n(d) | n(g) | n(C) | n(F) |
|---|---|---|---|---|---|---|
| 0 (OBJ) | | INFINITY | 1.000000 | 1.000000 | 1.000000 | 1.000000 |
| 1* | 1.40000 | 0.66000 | 1.693500 | 1.709700 | 1.689550 | 1.702580 |
| 2* | 2.07215 | 0.10000 | 1.000000 | 1.000000 | 1.000000 | 1.000000 |
| 3 (STOP) | 0.00000 | 0.38000 | 1.000000 | 1.000000 | 1.000000 | 1.000000 |
| 4* | −0.72562 | 0.35000 | 1.527660 | 1.546190 | 1.518680 | 1.535820 |
| 5* | −1.07526 | 0.02000 | 1.527600 | 1.547700 | 1.523300 | 1.538500 |
| 6* (DOS) | −1.07526 | 0.00000 | 10001.000000 | 7418.685300 | 1170.425500 | 8274.731100 |
| 7* (DOS) | −1.07526 | 0.02000 | 1.556900 | 1.571100 | 1.553700 | 1.564800 |
| 8* | −1.07526 | 0.38000 | 1.000000 | 1.000000 | 1.000000 | 1.000000 |
| 9* | 7.00000 | 0.70000 | 1.524700 | 1.536490 | 1.521960 | 1.531290 |
| 10* | −2.59555 | 1.14109 | 1.000000 | 1.000000 | 1.000000 | 1.000000 |
| 11 | INFINITY | 0.28359 | 1.516330 | 1.526210 | 1.513860 | 1.521910 |
| 12 | INFINITY | 0.82658 | 1.000000 | 1.000000 | 1.000000 | 1.000000 |

As for a medium (=one of the layers forming the adhesion multiple-layer diffractive optical element DOE) between the fifth surface and the sixth surface, its viscosity in an uncured state is 100 cP and its refractive index for the d-line is 1.528. As for a medium (=the other of the layers forming the adhesion multiple-layer diffractive optical element DOE) between the seventh surface and the eighth surface, its viscosity in an uncured state is 4800 cP and its refractive index for the d-line is 1.557.

Table 4 shows data of the aspheric surfaces (including the diffractive optical surfaces). A notation system of Table 4 is the same as that of Table 2.

TABLE 4

| m | K | $C_2$ | $C_4$ | $C_6$ | $C_8$ | $C_{10}$ |
|---|---|---|---|---|---|---|
| 1 | 1.9191 | 0.00000 | $1.14020 * 10^{-2}$ | $-1.35330 * 10^{-3}$ | $1.58670 * 10^{-2}$ | $-2.26440 * 10^{-4}$ |
| 2 | 2.6987 | 0.00000 | $5.52610 * 10^{-2}$ | $2.31810 * 10^{-1}$ | $-3.51660 * 10^{-1}$ | $2.84840 * 10^{-1}$ |
| 4 | 0.7721 | 0.00000 | $3.54290 * 10^{-1}$ | $2.21480 * 10^{-1}$ | $-2.03660 * 10^{-1}$ | $-5.20830 * 10^{-4}$ |
| 5 | −0.5653 | 0.00000 | $1.43130 * 10^{-1}$ | $9.80150 * 10^{-3}$ | $1.75640 * 10^{-2}$ | $-4.11900 * 10^{-2}$ |
| 6 | −0.5653 | 0.00000 | $1.43130 * 10^{-1}$ | $9.80150 * 10^{-3}$ | $1.75640 * 10^{-2}$ | $-4.11900 * 10^{-2}$ |
| 7 | −0.5653 | $-1.30000 * 10^{-6}$ | $1.43130 * 10^{-1}$ | $9.80520 * 10^{-3}$ | $1.75540 * 10^{-2}$ | $-4.11870 * 10^{-2}$ |
| 8 | −0.5653 | 0.00000 | $1.43130 * 10^{-1}$ | $9.80520 * 10^{-3}$ | $1.75540 * 10^{-2}$ | $-4.11870 * 10^{-2}$ |
| 9 | 0.0000 | 0.00000 | $2.06990 * 10^{-2}$ | $-9.36420 * 10^{-3}$ | $1.80000 * 10^{-3}$ | $-2.81080 * 10^{-5}$ |
| 10 | 0.5771 | 0.00000 | $-9.62950 * 10^{-3}$ | $1.63880 * 10^{-3}$ | $2.00000 * 10^{-3}$ | $-8.00000 * 10^{-5}$ |

Corresponding values of condition of this example are as follows:
Y=1.8,
L=4.861,
$\Delta\upsilon d$=15.46,
$\Delta Nd$=0.0293,
Eg=98.221,
EC=98.233,
Ed=99.999,
C=1.2,
f=3.320,
R=−1.07526,
$\Delta$=0.0194,
p=0.00354,
d1=0.02,
d2=0.02,
d=0.39,
Z=0.75,
Y/L of the conditional expression (1)=0.3703,
(d1+d2)/d of the conditional expression (2)=0.103,
Z/R of the conditional expression (3)=−0.69751,
p/(d1+d2) of the conditional expression (4)=0.0885,
$\Delta\upsilon d/\Delta Nd$ of the conditional expression (5)=527.645,
(Eg+EC)/2 of the conditional expression (6)=98.227,
0.9×Ed of the conditional expression (6)=89.999,
$\theta$ of the conditional expression (7)=6.431°,
C/f of the conditional expression (8)=0.361,
|R/L| of the conditional expression (9)=0.2212,
$\Delta$/f of the conditional expression (10)=0.0058, and
p/f of the conditional expression (11)=0.0011.

That is, the shooting lens of this example satisfies all the conditional expressions (1) to (11).

Figure 10:
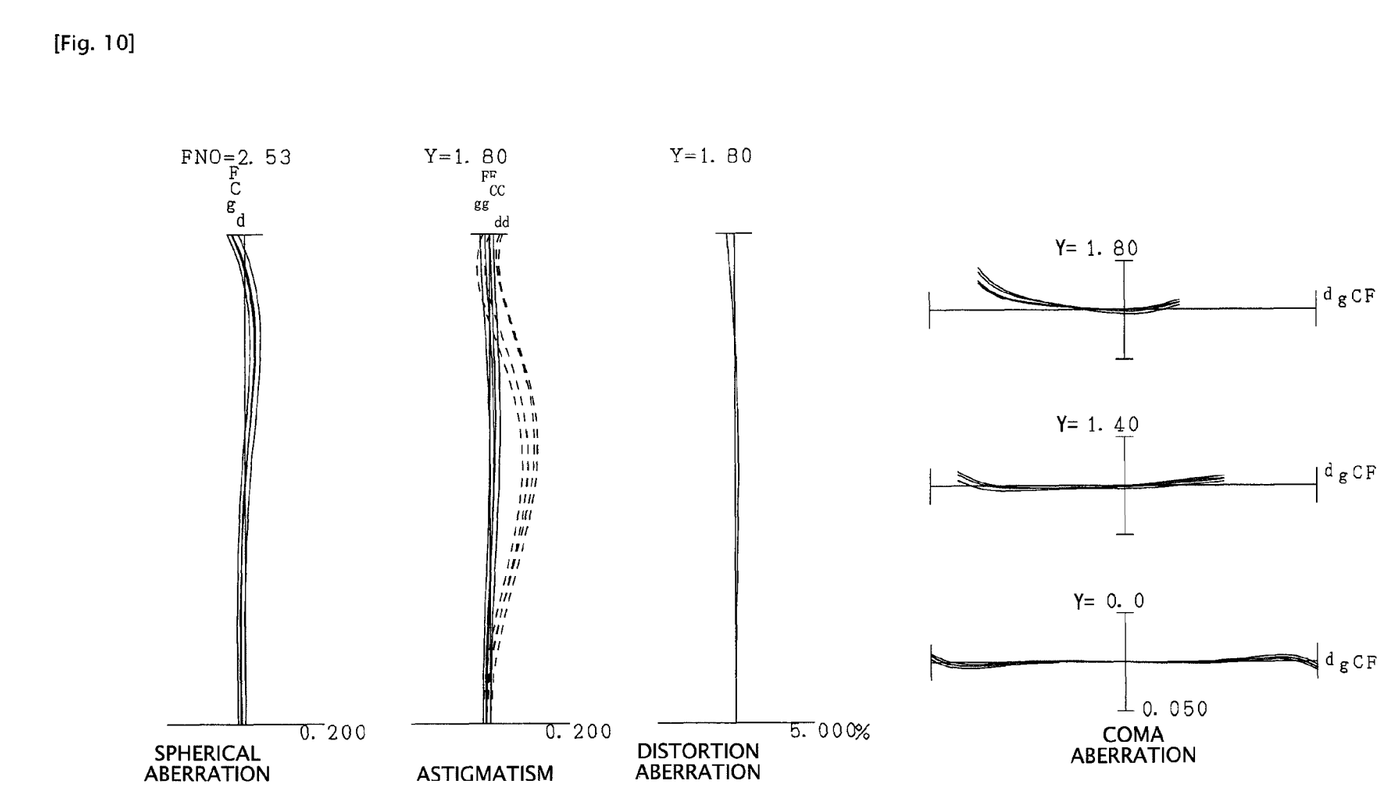
FIG. 10 is a various aberrations diagram of the second example.

FIG. 10 is a various aberrations diagram. A notation system of FIG. 10 is the same as that of FIG. 8. As shown in FIG. 10, in this example, excellent imaging quality is obtained with various aberrations being favorably corrected.

Example 3

A third example of the shooting lens will be described.

Figure 11:
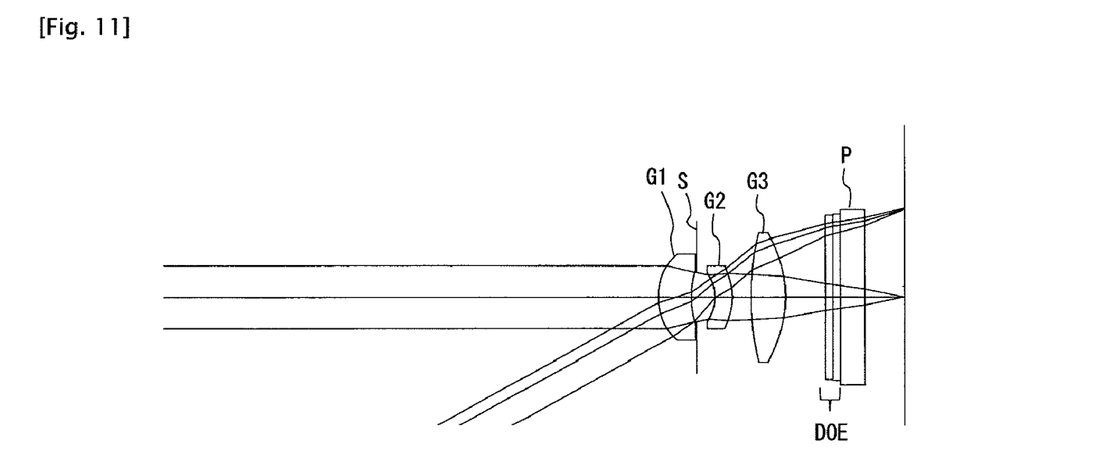
FIG. 11 is a ray diagram of a shooting lens of a third example.

FIG. 11 is a ray diagram of a shooting lens of this example. As shown in FIG. 11, the shooting lens has, in order from an object side, a first lens G1 having a positive refractive power, a second lens G2 having a negative refractive power, a third lens G3 having a positive refractive power, and a parallel plate P. On an object-side surface of the parallel plate P out of these, the adhesion multiple-layer diffractive optical element DOE of the type shown in FIG. 2 is formed.

Table 5 shows lens data of the shooting lens of this example. A notation system of Table 3 is the same as that of Table 1. Further, a conversion method by an ultrahigh refractive index method is the same as that of the first example.

TABLE 5

| m | r | d | n(d) | n(g) | n(C) | n(F) |
|---|---|---|------|------|------|------|
| 0 (OBJ) |  | INFINITY | 1.000000 | 1.000000 | 1.000000 | 1.000000 |
| 1* | 1.40000 | 0.66000 | 1.693500 | 1.709700 | 1.689550 | 1.702580 |
| 2* | 2.07215 | 0.10000 | 1.000000 | 1.000000 | 1.000000 | 1.000000 |
| 3 (STOP) | 0.00000 | 0.38000 | 1.000000 | 1.000000 | 1.000000 | 1.000000 |
| 4* | −0.72562 | 0.35000 | 1.517420 | 1.529800 | 1.514440 | 1.524310 |
| 5* | −1.07526 | 0.38000 | 1.000000 | 1.000000 | 1.000000 | 1.000000 |
| 6* | 7.00000 | 0.70000 | 1.524700 | 1.536490 | 1.521960 | 1.531290 |
| 7* | −2.59655 | 0.80000 | 1.000000 | 1.000000 | 1.000000 | 1.000000 |
| 8 | INFINITY | 0.15000 | 1.527600 | 1.547700 | 1.523300 | 1.538500 |
| 9* (DOS) | INFINITY | 0.00000 | 10001.000000 | 7418.685300 | 11170.425500 | 8274.731100 |
| 10* (DOS) | INFINITY | 0.15000 | 1.556900 | 1.571100 | 1.553700 | 1.564800 |
| 11 | INFINITY | 0.50000 | 1.516330 | 1.526210 | 1.513860 | 1.521910 |
| 12 | INFINITY | 0.83560 | 1.000000 | 1.000000 | 1.000000 | 1.000000 |

As for a medium (=one of the layers forming the adhesion multiple-layer diffractive optical element DOE) between the eighth surface and the ninth surface, its viscosity is 100 cP and its refractive index for the d-line is 1.528. As for a medium (=the other of the layers forming the adhesion multiple-layer diffractive optical element DOE) between the tenth surface and the eleventh surface, its viscosity is 4800 cP and its refractive index for the d-line is 1.557.

Table 6 shows data of the aspheric surfaces (including the diffractive optical surfaces). A notation system of Table 6 is the same as that of Table 2.

TABLE 6

| m | K | $C_2$ | $C_4$ | $C_6$ | $C_8$ | $C_{10}$ |
|---|---|-------|-------|-------|-------|----------|
| 1 | 1.9191 | 0.00000 | $1.14020 * 10^{-2}$ | $-1.35330 * 10^{-3}$ | $1.58670 * 10^{-2}$ | $-2.26440 * 10^{-4}$ |
| 2 | 2.6987 | 0.00000 | $5.52610 * 10^{-2}$ | $2.31810 * 10^{-1}$ | $-3.51660 * 10^{-1}$ | $2.84840 * 10^{-4}$ |
| 4 | 0.7721 | 0.00000 | $3.54290 * 10^{-1}$ | $2.21480 * 10^{-1}$ | $-2.03660 * 10^{-1}$ | $-5.20830 * 10^{-4}$ |
| 5 | −0.5653 | $1.00000 * 10^{-7}$ | $1.43130 * 10^{-1}$ | $9.80150 * 10^{-1}$ | $1.75640 * 10^{-2}$ | $-4.11900 * 10^{-2}$ |
| 6 | 0.0000 | 0.00000 | $2.06990 * 10^{-2}$ | $-9.36420 * 10^{-3}$ | $1.80000 * 10^{-3}$ | $-2.81080 * 10^{-5}$ |
| 7 | 0.5771 | 0.00000 | $-9.62950 * 10^{-3}$ | $1.63880 * 10^{-3}$ | $2.00000 * 10^{-3}$ | $-8.00000 * 10^{-5}$ |
| 9 | 1.0000 | $5.00000 * 10^{-6}$ | $-8.00000 * 10^{-7}$ | $0.00000 * 10^{+0}$ | $0.00000 * 10^{+0}$ | $0.00000 * 10^{+0}$ |

Corresponding values of condition of this example are as follows:
Y=1.8,
L=5.006,
Δυd=15.46,
ΔNd=0.0293,
Eg=98.221,
EC=98.233,
Ed=99.999,
C=3.06,
f=3.109,
R=infinity,
Δ=0.0199,
p=0.0153,
d1=0.15,
d2=0.15,
d=0.38,
Z=2.76,
Y/L of the conditional expression (1)=0.3596,
(d1+d2)/d of the conditional expression (2)=0.462,
Z/R of the conditional expression (3)=0,
p/(d1+d2) of the conditional expression (4)=0.051,
Δυd/ΔNd of the conditional expression (5)=527.645,
(Eg+EC)/2 of the conditional expression (6)=98.227,
0.9×Ed of the conditional expression (6)=89.999,
θ of the conditional expression (7)=0.0015°,
C/f of the conditional expression (8)=0.984,
|R/L| of the conditional expression (9)=infinity,
Δ/f of the conditional expression (10)=0.0065, and
p/f of the conditional expression (11)=0.0050.

That is, the shooting lens of this example satisfies the conditional expressions (1), (2), and (4) to (11) though not satisfying the conditional expression (3).

Figure 12:
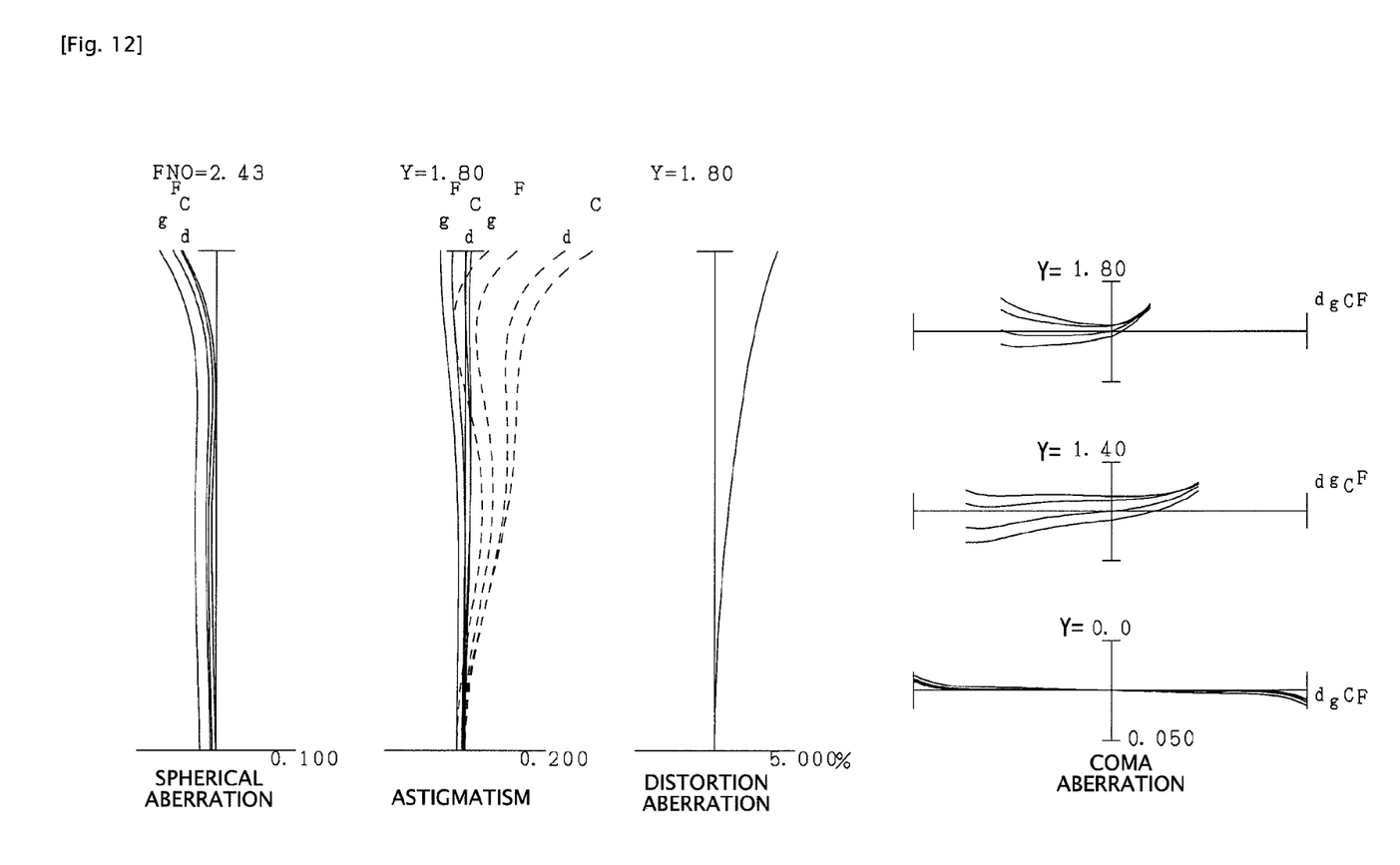
FIG. 12 is a various aberrations diagram of the third example.

FIG. 12 is a various aberrations diagram. A notation system of FIG. 12 is the same as that of FIG. 8. As shown in FIG. 12, in this example, excellent imaging quality is obtained with various aberrations being favorably corrected.

The many features and advantages of the invention are apparent from the foregoing description. It is to be understood that the invention is not limited to the described embodiments, which are intended to be illustrative and not limiting. As will readily occur to those skilled in the art, numerous changes and modifications are possible in keeping with the principles and spirit of the invention, the scope of which is defined in the appended claims.

The invention claimed is:

1. A shooting lens comprising
at least three lens groups disposed in order from an object side, wherein:
an adhesion multiple-layer diffractive optical element is formed on one of surfaces disposed between an object surface and an imaging plane; and
a thickness d1 on an optical axis of one of two layers in mutual adhesion of the adhesion multiple-layer diffractive optical element, a thickness d2 on the optical axis of the other of the two layers, and a minimum grating pitch p of a diffractive optical surface of the adhesion mul tiple-layer diffractive optical element satisfy conditional expression (4) below $$0.001 < p/(d1+d2) < 1.0 \qquad (4).$$

2. A shooting lens according to claim 1, wherein a maximum image height Y and an entire length L of the shooting lens satisfy conditional expression (1) below $$0.1 < Y/L < 3.0 \qquad (1).$$

3. A shooting lens according to claim 1, wherein the thickness d1, the thickness d2, and a total thickness d (including d1 and d2) on the optical axis of the lens group as a formation location of the adhesion multiple-layer diffractive optical element satisfy conditional expression (2) below $$0.02 < (d1+d2)/d < 1.0 \qquad (2).$$

4. A shooting lens comprising according to claim 1, wherein
a distance Z on the optical axis from the diffractive optical surface of the adhesion multiple-layer diffractive optical element to an aperture stop and a paraxial curvature radius R of a base surface on which the adhesion multiple-layer diffractive optical element is formed satisfy conditional expression (3) below $$-2.0 < Z/R < -0.3 \qquad (3).$$

5. The shooting lens according to claim 1, wherein:
one of the two layers in mutual adhesion of the adhesion multiple-layer diffractive optical element is made of a high refractive index and small dispersion material, and the other is made of a low refractive index and large dispersion material; and
an Abbe number difference $\Delta\upsilon d$ between the two layers and a refractive index difference $\Delta Nd$ between the two layers satisfy conditional expression (5) below $$50 < \Delta\upsilon d/\Delta Nd < 2000 \qquad (5).$$

6. The shooting lens according to claim 1, wherein a diffraction efficiency Ed for a d-line, a diffraction efficiency Eg for a g-line, and a diffraction efficiency EC for a C-line of the adhesion multiple-layer diffractive optical element satisfy conditional expression (6) below $$(Eg+EC)/2 > 0.9 \times Ed \qquad (6).$$

7. The shooting lens according to claim 1, wherein an incident angle $\theta$ at which a principal ray of a light flux directed to a maximum image height passing through the shooting lens is incident on the adhesion multiple-layer diffractive optical element satisfies a conditional expression (7) below $$\theta < 10° \qquad (7).$$

8. The shooting lens according to claim 1, wherein an effective diameter C of the adhesion multiple-layer diffractive optical element and a focal length f of a whole system of the shooting lens satisfy conditional expression (8) below $$0.1 < C/f < 3.0 \qquad (8).$$

9. The shooting lens according to claim 1, wherein each of the three lens groups has a positive refractive power.

10. The shooting lens according to claim 1, wherein a radius of curvature R of the base surface on which the adhesion multiple-layer diffractive optical element is formed and the entire length L of the shooting lens satisfy conditional expression (9) below $$0.05 < |R/L| \qquad (9).$$

11. A camera comprising:
a shooting lens according to claim 1; and
an imaging device disposed near the imaging plane of the shooting lens.

\* \* \* \* \*